US012664871B2

(12) United States Patent
Scott

(10) Patent No.: US 12,664,871 B2
(45) Date of Patent: Jun. 23, 2026

(54) AUTOMATED HOLOGRAPHY USING WIFI RADIATION FOR INTERIOR MAPPING

(71) Applicant: T-MOBILE INNOVATIONS LLC, Overland Park, KS (US)

(72) Inventor: Kade Lee Scott, McKinney, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 259 days.

(21) Appl. No.: 18/528,369

(22) Filed: Dec. 4, 2023

(65) Prior Publication Data

US 2025/0182604 A1 Jun. 5, 2025

(51) Int. Cl.
| | |
|---|---|
| *G08B 25/00* | (2006.01) |
| *G01S 7/00* | (2006.01) |
| *G01S 13/00* | (2006.01) |
| *G01S 13/89* | (2006.01) |
| *G03H 5/00* | (2006.01) |

(52) U.S. Cl.
CPC ............. *G08B 25/00* (2013.01); *G01S 7/006* (2013.01); *G01S 13/89* (2013.01); *G03H 5/00* (2013.01); *G01S 13/003* (2013.01)

(58) Field of Classification Search
CPC ....... G08B 25/00; G08B 27/001; G01S 7/006; G01S 13/89; G01S 13/003; G01S 13/42; G03H 5/00; G03H 1/0005; G03H 1/0443; H04W 4/33; H04W 4/90; H04W 84/12
See application file for complete search history.

(56) References Cited

U.S. PATENT DOCUMENTS

| | | | | |
|---|---|---|---|---|
| 6,084,510 A | * | 7/2000 | Lemelson | .............. G08G 1/164 382/104 |
| 7,532,895 B2 | * | 5/2009 | Hrastar | .............. H04W 12/033 455/457 |
| 9,699,621 B1 | * | 7/2017 | Jarrett | ................... H04W 12/03 |
| 10,074,356 B1 | * | 9/2018 | Sarkar | ................... G08B 17/00 |
| 2005/0001720 A1 | * | 1/2005 | Mason | ................... G01S 19/17 340/539.2 |

(Continued)

OTHER PUBLICATIONS

International Search Report and Written Opinion received for PCT Patent Application No. PCT/US2024/058353, mailed on Feb. 5, 2025, 12 pages.

*Primary Examiner* — Daryl C Pope

(74) *Attorney, Agent, or Firm* — SHOOK, HARDY & BACON L.L.P.

(57) ABSTRACT

Automated holography using WiFi radiation may be triggered by an event such as a shooting, weather event, fire, or mass casualty. A method begins with sensors detecting a triggering event. The sensors may be mounted on access points, buildings, or other nearby structures. The sensors may be of different types, including aural sensors for detecting noises, such as gunshots, visual sensors, vibration sensors, and the like. The sensors then contact nodes within a predetermined distance of the triggering event using a network router. Additional nodes may include other access nodes within the predetermined distance, relays, repeaters, other network routers, and user devices. After contacting the applicable nodes, automatic mapping of an interior of the location of the triggering event is performed using WiFi radiation. The interior mapping of the location of the triggering event is then transmitted to at least one emergency service.

19 Claims, 4 Drawing Sheets

(56)         References Cited

U.S. PATENT DOCUMENTS

| | | | | |
|---|---|---|---|---|
| 2007/0103292 | A1* | 5/2007 | Burkley | G07C 9/28 |
| | | | | 340/539.2 |
| 2007/0120671 | A1* | 5/2007 | Carmichael | G07C 9/28 |
| | | | | 340/8.1 |
| 2015/0312696 | A1* | 10/2015 | Ribbich | H04W 4/029 |
| | | | | 455/418 |
| 2016/0232774 | A1* | 8/2016 | Noland | G08B 25/10 |
| 2017/0048678 | A1* | 2/2017 | Hong | H04W 4/029 |
| 2018/0158305 | A1 | 6/2018 | Noland et al. | |
| 2018/0261202 | A1 | 9/2018 | Sarkar et al. | |
| 2021/0073436 | A1* | 3/2021 | Duff | G02B 27/0093 |
| 2022/0141637 | A1 | 5/2022 | Pellegrini et al. | |

* cited by examiner

AUTOMATED HOLOGRAPHY USING WIFI RADIATION FOR INTERIOR MAPPING

BACKGROUND

There are situations that arise when it is desirable to capture the interior mapping of a room or structure based on a plurality of inputs. The space needing interior mapping may be a single room or may be rooms in multiple buildings. Such situations could include: evacuations scenarios, health assistance scenarios, a lost child, and similar emergency-type/urgent situations. Locating a person quickly under these circumstances may save lives. As wireless communication has become ubiquitous, in many cases other users are also physically present in the same location and an access point may also be nearby. Inputs are needed for interior mapping and at present, automatically initiating interior mapping of a location based on one or more trigger inputs is not available.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for automated holography using WiFi radiation for interior mapping are provided. Automated holography using WiFi radiation may be triggered by an event such as a weather event, public threat, fire, or mass casualty. A method begins with sensors detecting a triggering event. Sensors may be mounted on access points, buildings, or other nearby structures. The sensors may be of different types, including aural sensors for detecting noises, such as gunshots, visual sensors, vibration sensors, and the like. The sensors can communicate with nodes within a predetermined distance of the triggering event using a network router. The nodes may include other access nodes within the predetermined distance, relays, repeaters, other network routers, and user devices. After contacting all of the applicable nodes, automatic mapping of an interior of the location of the triggering event is performed using WiFi radiation. The interior mapping of the location of the triggering event is then transmitted to at least one emergency service.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
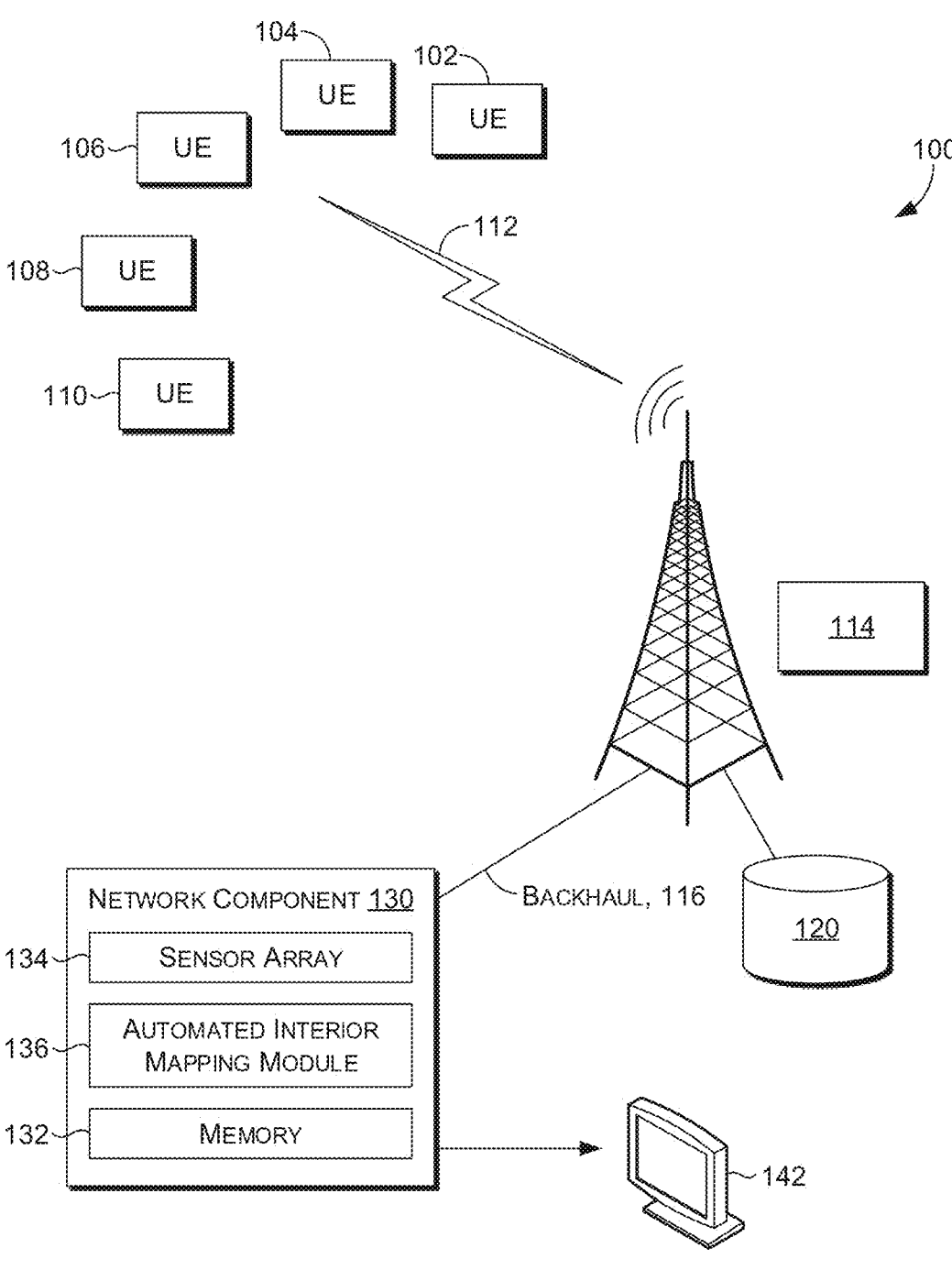
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure.

Further, various technical terms are used throughout this description. An illustrative resource that fleshes out various aspects of these terms can be found in Newton's Telecom Dictionary, $32^{nd}$ Edition (2022).

Aspects disclosed herein provide a system and method for automated interior mapping using WiFi radiation in a wireless network. The interior mapping system may be a fixed position device, a mobile device, or a combination of fixed and mobile devices. The interior mapping system also provides navigation services to direct and redirect emergency personnel as needed in response to a triggering event. The triggering event may be a mass shooting, fire, serious accident, or similar event.

The automated interior mapping system acts in conjunction with sensor arrays or sensors that may be mounted on access points, buildings, police and fire stations, mobile network routers, and wherever triggering event coverage is desired. The sensor arrays are part of a wireless network and are positioned such that triangulation of the location of the triggering event is performed once a triggering event occurs. The triggering event is recorded by the sensor arrays and causes the mobile network router to contact all applicable access points within an area. The area may be determined by triangulating the sensor arrays that were activated by the triggering event. The automated interior mapping system then generates an interior mapping of the location of the triggering event in real time and shares that location with applicable emergency response services, medical professionals, and other personnel as needed. The automated interior mapping is completed using WiFi to perform the holography to generate the interior mapping. The method and system may also provide automated communication of the location of the triggering event to emergency personnel and may also allocate additional network bandwidth for emergency operations in the area/location where the triggering event is located.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of access points (i.e., access point, node, cell sites, cell towers) to provide network coverage. The access points are employed to broadcast and transmit transmissions to user devices of the telecommunications network. An access point may be considered to be a portion of an access point that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, an access point may comprise one access point or more than one access point. Factors that can affect the telecommunications transmission include, e.g., location and size of the access points, and frequency of the transmission, among other factors. The access points are employed to broadcast and transmit transmissions to user devices of the telecommunications network. Traditionally, the access point establishes uplink (or downlink) transmission with a mobile handset over a single frequency that is exclusive to that particular uplink connection (e.g., an LTE connection with an EnodeB). The access point may include one or more sectors served by individual transmitting/receiving components associated with the access point (e.g., antenna arrays controlled by an EnodeB). These transmitting/receiving components together form a multi-sector broadcast arc for communication with mobile handsets linked to the access point.

As used herein, "access point" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE). The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby access point. A UE may be, in an embodiment, similar to computing device 400 described herein with respect to FIG. 4.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby access point or access point.

A first aspect of the present disclosure provides a method for automated interior mapping using WiFi radiation, in a network. The method comprises detecting a triggering event at a first location; based on detecting the triggering event, identifying one or more network nodes within a predetermined distance of the triggering event; initiating an automatic mapping of an interior of the first location of the triggering event to generate an interior mapping of the first location of the triggering event; and transmitting the interior mapping of the first location of the triggering event to a first destination.

A second aspect of the present disclosure provides a system for automated interior mapping using WiFi radiation. The system comprises one or more processors; and one or more computer-readable media storing computer-usable instructions that, when executed by the one or more processors, cause the one or more processors to: detect a triggering event at a first location; based on detecting the triggering event, identify one or more network nodes within a predetermined distance of the triggering event; initiate an automatic mapping of an interior of the first location of the triggering event to generate an interior mapping of the first location of the triggering event; and transmit the interior mapping of the first location of the triggering event to a first destination.

Another aspect of the present disclosure is directed to a non-transitory computer storage media storing computer-usable instructions that cause the processors to detect a triggering event at a first location; based on detecting the triggering event, identify one or more network nodes within a predetermined distance of the triggering event; initiate an automatic mapping of an interior of the first location of the triggering event to generate an interior mapping of the first location of the triggering event; and transmit the interior mapping of the first location of the triggering event to a first destination.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user devices (UE) 102, 104, 106, 108, and 110, access point 114 (which may be a cell site, access point, or the like), and one or more communication channels 112. The communication channels 112 can communicate over frequency bands assigned to the carrier. In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 400) that communicates via wireless communications with the access point 114 in order to interact with a public or private network. A UE may also be a wearable device such as a smart watch, smart glasses, fitness tracker or similar device.

Figure 4:
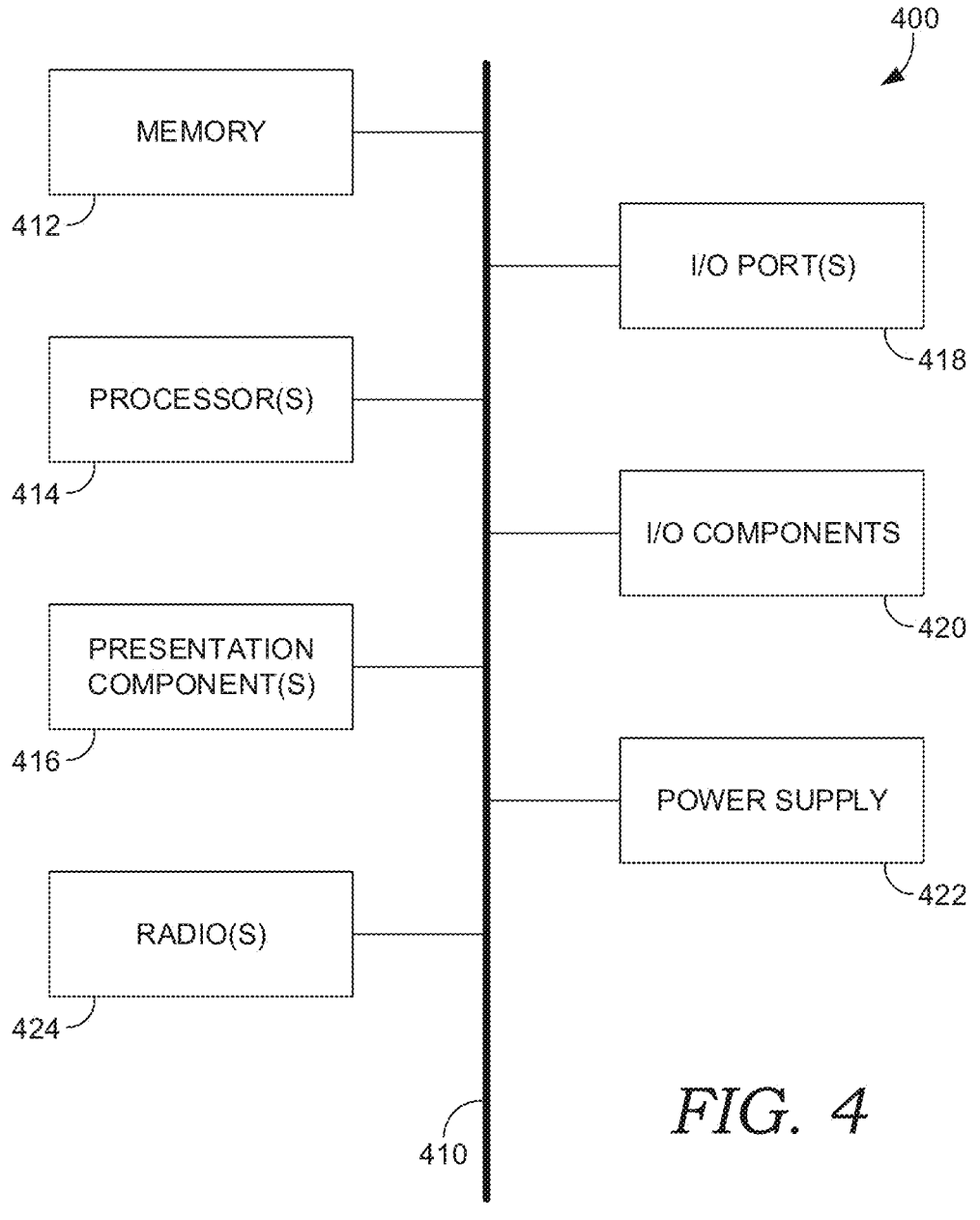
FIG. 4 depicts an exemplary computing device suitable for use in implementations of the present disclosure, in accordance with aspects herein.

In some aspects, each of the UEs 102, 104, 106, 108, and 110 may correspond to computing device 400 in FIG. 4. Thus, a UE can include, for example, a display(s), a power source(s) (e.g., a battery), a data store(s), a speaker(s), memory, a buffer(s), a radio(s) and the like. In some implementations, for example, a UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, 6G, LTE, CDMA, or any other type of network. In some cases, UEs 102, 104, 106, 108, and 110 in network environment 100 can optionally utilize one or more communication channels 112 to communicate with other computing devices (e.g., a mobile device(s), a server (s), a personal computer(s), etc.) through access point 114.

The network environment 100 may be comprised of a telecommunications network(s), or a portion thereof. A telecommunications network might include an array of devices or components (e.g., one or more access points), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure. Network environment 100 may comprise equipment placed in network operator facilities, but may also comprise equipment located at a customer's premises, known as customer premises equipment (CPE).

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network. The telecommunication network may also provide services using MU-MIMO techniques.

Figure 2:
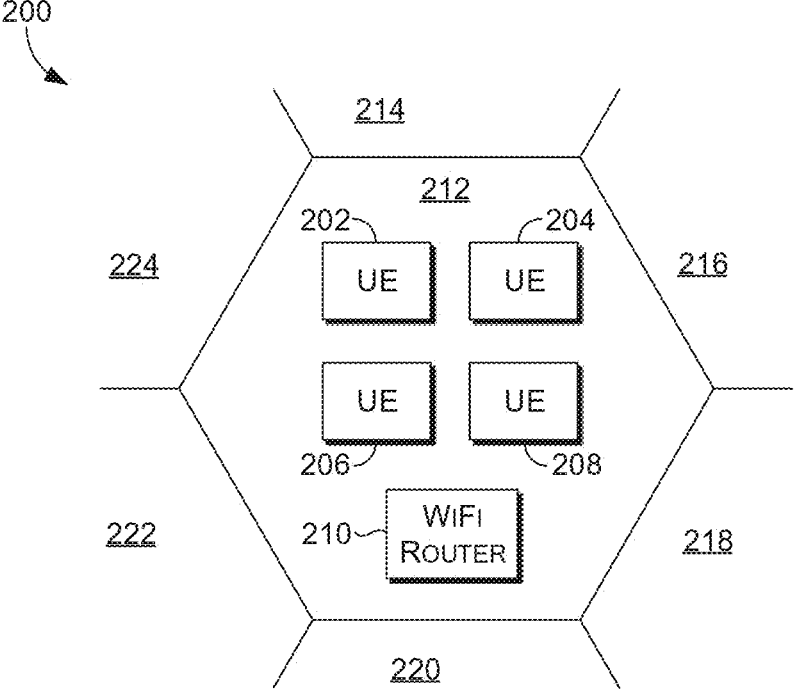
FIG. 2 depicts a cellular network suitable for use in implementations of the present disclosure, in accordance with aspects herein.

In some implementations, access point 114 is configured to communicate with a UE, such as UEs 102, 104, 106, 108, and 110, that are located within the geographic area, or cell, covered by radio antennas of access point 114. FIG. 2, below, illustrates multiple cells in a network. Access point 114 may include one or more access points, base transmitter stations, radios, antennas, antenna arrays, power amplifiers, transmitters/receivers, digital signal processors, control electronics, GPS equipment, sensors and sensor arrays and the like.

As shown, access point 114 is in communication with a network component 130 and at least a network database 120 via a backhaul channel 116. As the UEs 102, 104, 106, 108, and 110 collect individual signal information, the signal information can be automatically communicated by each of the UEs 102, 104, 106, 108, and 110 to the access point 114. Access point 114 may store the signal information and data communicated by the UEs 102, 104, 106, 108, and 110 at a network database 120. Alternatively, the access point 114 may automatically retrieve the status data from the UEs 102, 104, 106, 108, and 110, and similarly store the data in the network database 120. The signal information and data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the access point 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, a sensor array 134, and an automated interior mapping module 136. All determinations, calculations, and data further generated by the sensor array 134 and the automated interior mapping module 136 may be stored at the memory 132 and also at the network database 120. Computer terminal 142 is in communication with the network component 130 and with the memory 132, sensor array 134, and automated interior mapping module 136 through the network component 130. Although the network component 130 is shown as a single component comprising the memory 132, sensor array 134, and automated interior mapping module 136, it is also contemplated that each of the memory 132, sensor array 134, and automated interior mapping module 136 may reside at different locations, be its own separate entity, and the like, within the home network carrier system.

The network component 130 is configured to track sensor data from the sensor array 134, from the access point 114, or one of more of the UEs, 102, 104, 106, 108, and 110. The network component 130 can also track sensor data from the sensor array 134 using geolocation or other location measurements. The sensor array 134 may be located at an access point, building, or central office and may be one of many sensor arrays 134 deployed throughout the network. The automated interior mapping module 136 may be located in a central office or other centralized location, but may also be mounted on an access point. The sensor array 134 acts in response to a triggering event. In conjunction with automated interior mapping module 136, the system can determine a location of the triggering event and map an interior of the location of the triggering event. The network component 130 may also communicate with emergency services to provide the automated interior mapping information to emergency personnel in real time.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cell sites 212, 214, 216, 218, 220, 222, 224, each including access point 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and WiFi router 210, may be located within geographic area 200 collecting UE data that is useable by network component 130, in accordance with aspects herein. UEs 202, 204, 206, 208, and WiFi router 210 can move within the cell currently occupying, such as cell site 212 and can move to other cells such as adjoining cell sites 214, 216, 218, 220, 222 and 224.

Operation of the automated interior mapping system begins with a triggering event that may be detected by the sensor array 134. The sensor array 134 may be mounted on an access point 114, but may also be mounted on a building, mobile cellular on wheels system, a central office, or other desired location. The sensors collect data and initiate a triangulation process to locate the triggering event where automated interior mapping may be needed. The activation of the sensor array 134 also triggers the access point 114 to begin automated interior mapping.

Automated interior mapping uses holography. Holography can be done with light, for example, using lasers to map an object. In holography, when light is scattered from an object, the scattering reflects the three dimensional structure of the object. While lasers are one potential holographic tool, WiFi signals can also be used for holography and offer the advantage of being able to penetrate walls. Using WiFi signals to automatically map a room where a triggering event (e.g., a shooting) has occurred or is occurring may provide emergency personnel with detailed information necessary to respond, such as a location of a shooter/where a firearm was fired, entrance and exit points in a location, room layouts including physical objects therein (e.g., desks, chairs, tables, etc.), and the like.

During holography, a signal is directed at an object or room of interest. When the signal is scattered from the object or room, the three dimensional structure of the object or room can be identified using the scattering of the light affected by the three dimensional structure. Some of the information about the room may be lost during recording of the scattering. The recording process captures a fraction of the WiFi signal and records how strong the signal is. When the strength of the signal is recorded, the phase of the signal is lost. The lost information can include how far the signal has traveled since scattering from the room or object. However, the distance the signal has traveled can be recovered by measuring the phase and amplitude of the signal field.

Holography recovers the lost phase information by mixing two fields, one field that scattered from the object or room being imaged, and another field that did not scatter during the imaging process. These two fields can interfere with one another. The strength of the WiFi signal is recorded. The strength of the WiFi signal is determined by two components: the amount of the signal scattered by the object or room and the relative phase between the scattered light and the unscattered light. The resulting pattern holds a three dimensional record of the object or room, in a two dimensional pattern.

WiFi signals work well in holography because the signals are efficiently reflected by metal. In a room with one WiFi transmitter, the signal recorded at a receiving antenna is already a mixture of the WiFi signals from many different directions after being scattered by the metal objects in the room. The metal objects may be doorknobs, desks, tables, picture frames, nails, and other common objects. Holography relies on filtering out the contributions from the reflections and ensuring that the image produced is dominated by the scattering from the object of interest. A two dimensional interference pattern may be produced by scanning an area with a first antenna while measuring a WiFi signal. The received signal may then be mixed with a second recording from the transmitter, which may be obtained using a fixed antenna. The resulting interference pattern can then be used to reconstruct a three dimensional image, in this case, an interior room.

The automated interior mapping system initiates the holographic interior mapping process once a triggering event is detected by the sensor array 134. Sensor array 134 has a network identifier for the WiFi network and can send a notification to all devices/network nodes in the network. In response to the triggering event, the mobile network contacts all nodes within a predetermined distance via a network router within the area of the triggering event. The predetermined distance may be a set distance, such as one mile from the triangulated location of the triggering event. The predetermined distance may also be based on the nearest public safety office to the triggering event. The network router may be a WiFi router. The nodes may be access points, WiFi routers within the area of the triggering event, and UE devices carried by individuals in the vicinity (i.e., within a predetermined distance) of the triggering event. The nodes selected may be selected based on proximity to a triggering event, based on geolocation information normally transmitted to the network. The nodes may also be antennas placed in the interior of the building and may also be temporary mobile antennas brought into the area. Mobile antennas could also be deployed on unmanned aerial vehicles for service over a triggering event. Once the applicable nodes have been triggered, automated interior mapping using holography with WiFi signals is performed to generate a real time map of the interior of the room where the triggering event occurred. In the event the triggering event occurs outdoors, mapping of nearby objects may be performed. The automated interior mapping is then provided to emergency personnel. In addition, additional bandwidth for emergency communications may also be commandeered from access points in the area of the triggering event.

In addition to the sensor arrays and antennas, UEs within the room or location may also act to provide redundancy to the WiFi router system. UEs nearest to the room or location may be used when the coverage in the area of the triggering event is weak, or there are multiple possible locations of the triggering event. The closest WiFi router may be activated to perform the holography. In order to be capable of performing the holography, the router must have a predetermined amount of bandwidth (e.g., 300 Mbps). Greater bandwidth capacity in the WiFi routers used for the holography will produce better images. If necessary, the network operator could selectively boost WiFi routers in the area of the triggering event to provide additional bandwidth for holography. The WiFi routers in the area may be boosted through increased signal power or additional data throughput capacity assignment.

Figure 3:
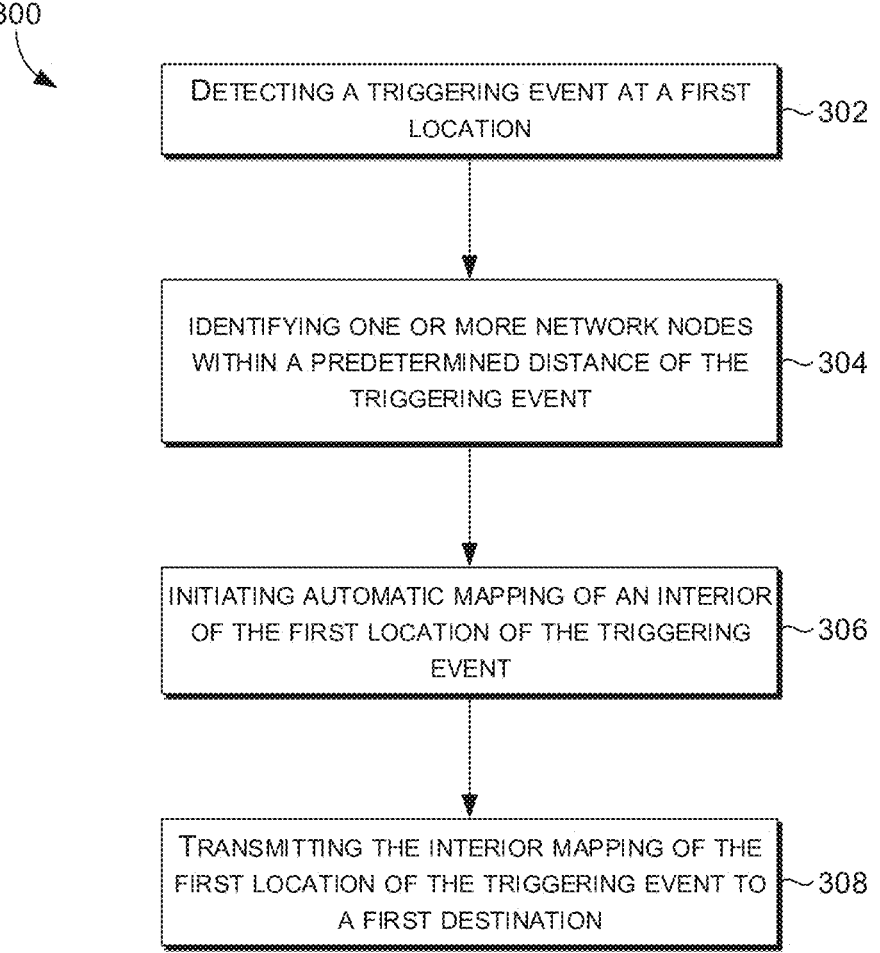
FIG. 3 depicts a flow diagram of an exemplary method for automated interior mapping using WiFi radiation, in a network, in accordance with aspects herein.

FIG. 3 depicts a flow diagram of an exemplary method for automated interior mapping using WiFi radiation, in a network, in accordance with aspects herein. The method 300 begins in step 302 with detecting a triggering event at a first location. The triggering event may be a shooting, accident, fire, weather event, mass casualty event, or other event that has the potential to cause serious injury or loss of life. The triggering event can be identified using a variety of sensors including acoustic sensors, visual sensors, heat sensors, pressure sensors, traffic cameras, and the like. The sensors can be trained to identify predetermined triggering events. For instance, a heat sensor detecting a heat above a predetermined threshold can identify a fire as a triggering event. As another example, an acoustic sensor may be trained to distinguish a gun shot from a car backfiring while a traffic camera can be trained to identify a car accident from a traffic jam.

The method then continues in step 304 where, one or more network nodes within a predetermined distance of the triggering event are identified. Nodes within a predetermined distance of the triggering event may include access nodes for a wireless network, a repeater linked to the wireless network, a second network router, or user devices within the predetermined distance. The predetermined distance may be based on the accuracy and distance that the sensor array can operate, or, may be based on the location of emergency services facilities that could respond to the triggering event. The method then continues at step 306 to initiate automatic mapping of an interior of the first location of the triggering event. The first location of the triggering event may occur in a room in a particular building, multiple rooms in one building, or may be multiple rooms in multiple buildings at a common location, such as a college campus. The automatic interior mapping may also be performed outdoors using a predetermined size for the mapping area. The method concludes in step 308 with transmitting the interior mapping of the first location of the triggering event to a first destination. The first destination can be any relevant endpoint to notify of the triggering event including at least one emergency service.

Automatically mapping the interior comprises performing holography of the interior using WiFi radiation to generate the mapping. Once the interior mapping is complete, the interior mapping is transmitted with a high network priority. The interior mapping may be sent to emergency services, such as, but not limited to, police, fire, weather service, emergency management agencies, and similar service providers. For added security, the interior mapping may be transmitted to approved devices that may be official devices or registered devices used by emergency services personnel for event management. The predetermined distance from the triggering event location may be based on the type of sensor detecting the triggering event, the location of emergency services, and may take into account a type of sound triggering the sensor array.

The sensor array may be mounted on an access node tower or may be located on a building or other structure. In addition, the sensor array may be located on a repeater for the wireless network. Different types of sensors may be mounted on access nodes and multiple types of sensors may be part of the sensor array. Sensors may comprise aural sensors, video recording devices, cameras, vibration detectors, and motion detectors, to name a few. Triggering events may cause at least one sensor in the sensor array to activate, but, depending on the type of event, multiple sensors may be triggered.

FIG. 4 depicts an exemplary computing device suitable for use in implementations of the present disclosure, in accordance with aspects herein. With continued reference to FIG. 4, computing device 400 includes bus 410 that directly or indirectly couples the following devices: memory 412, one or more processors 414, one or more presentation components 416, input/output (I/O) ports 418, I/O components 420, radio(s) 424, and power supply 422. Bus 410 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 4 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. Memory 412 may be removable, nonremovable, or a combination thereof. Exemplary memory includes solid-state memory, hard drives, optical-disc drives, etc. Computing device 400 includes one or more processors 606 that read data from various entities such as bus 410, memory 412 or I/O components 420. One or more presentation components 416 present data indications to a person or other device. Exemplary one or more presentation components 416 include a display device, speaker, printing component, vibrating component, etc. I/O ports 418 allow computing device 400 to be logically coupled to other devices including I/O components 420, some of which may be built into computing device 400. Illustrative I/O components 420 include a microphone, joystick, game pad, satellite dish, scanner, printer, wireless device, etc.

The radio(s) 424 represents one or more radios that facilitate communication with a wireless telecommunications network. While a single radio 424 is shown in FIG. 4, it is contemplated that there may be more than one radio 424 coupled to the bus 410. Illustrative wireless telecommunications technologies include CDMA, GPRS, TDMA, GSM, and the like. The radio 424 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 424 can be configured to support multiple technologies and/or multiple radios can be utilized to support multiple technologies. A wireless telecommunications network might include an array of devices, which are not shown so as to not obscure more relevant aspects of the invention. Components such as a access point, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for automated interior mapping using WiFi radiation in a network, the method comprising:
   detecting a triggering event at a first location;
   based on detecting the triggering event, identifying one or more network nodes within a predetermined distance of the triggering event;
   initiating an automatic mapping of an interior of the first location of the triggering event to generate a real-time three-dimensional interior mapping of the first location of the triggering event, wherein the automatic mapping comprises performing WiFi holography by measuring phase and amplitude of scattered WiFi signals from the one or more network nodes to generate the real-time three-dimensional interior mapping of the first location of the triggering event; and
   transmitting the real-time three-dimensional interior mapping of the first location of the triggering event to a first destination.

2. The method of claim 1, wherein the triggering event is at least one of: a shooting, a fire, a natural disaster, a weather event, or a mass casualty event.

3. The method of claim 1, wherein the interior mapping is transmitted with a high network priority.

4. The method of claim 1, wherein the real-time three-dimensional interior mapping is transmitted to one or more devices associated with at least one emergency service.

5. The method of claim 1, wherein the triggering event is detected by aural sensors that are triggered when a predetermined decibel level is exceeded.

6. The method of claim 1, wherein the triggering event is detected by visual sensors.

7. The method of claim 1, wherein the triggering event is detected by vibration detectors that are triggered when a predetermined frequency level is exceeded.

8. The method of claim 1, wherein the real-time three-dimensional interior mapping is transmitted over a backhaul channel.

9. A system for automated interior mapping using WiFi radiation in a network, the system comprising:
   one or more processors; and one or more computer-readable media storing computer-usable instructions that, when executed by the one or more processors, cause the one or more processors to:

detect a triggering event at a first location;

based on detecting the triggering event, identify one or more network nodes within a predetermined distance of the triggering event;

initiate an automatic mapping of an interior of the first location of the triggering event to generate a real-time three-dimensional interior mapping of the first location of the triggering event, wherein the automatic mapping comprises performing WiFi holography by measuring phase and amplitude of scattered WiFi signals from the one or more network nodes to generate the real-time three-dimensional interior mapping of the first location of the triggering event; and transmit the real-time three-dimensional interior mapping of the first location of the triggering event to a first destination.

10. The system of claim 9, wherein the notification of the triggering event is identified by a sensor array.

11. The system of claim 9, wherein the triggering event is at least one of: a shooting, a fire, a natural disaster, or a mass casualty event.

12. The system of claim 10, wherein the triggering event is identified by at least one of: an aural sensor, a visual sensor, and a vibration sensor.

13. A non-transitory computer storage media storing computer-usable instructions that, when used by one or more processors, cause the processor to:

detect a triggering event at a first location;

based on detecting the triggering event, identify one or more network nodes within a predetermined distance of the triggering event;

initiate an automatic mapping of an interior of the first location of the triggering event to generate a real-time three-dimensional interior mapping of the first location of the triggering event, wherein the automatic mapping comprises performing WiFi holography by measuring phase and amplitude of scattered WiFi signals from the one or more network nodes to generate the real-time three-dimensional interior mapping of the first location of the triggering event; and transmit the real-time three-dimensional interior mapping of the first location of the triggering event to a first destination.

14. The non-transitory computer storage media of claim 13, wherein automatically mapping the interior comprises performing holography of the interior using WiFi radiation.

15. The non-transitory computer storage media of claim 13, wherein the triggering event is at least one of: a shooting, a fire, a natural disaster, a weather event, or a mass casualty event.

16. The non-transitory computer storage media of claim 14, wherein the real-time three-dimensional interior mapping is transmitted with a high network priority.

17. The non-transitory computer storage media of claim 14, wherein the real-time three-dimensional interior mapping is transmitted to one or more devices associated with at least one emergency service.

18. The non-transitory computer storage media of claim 13, wherein the triggering event is detected by one or more aural sensors that are triggered when a predetermined decibel level is exceeded.

19. The non-transitory computer storage media of claim 13, wherein the triggering event is detected by a visual sensor.

* * * * *